US012754527B2

(12) United States Patent
Ookura

(10) Patent No.: US 12,754,527 B2
(45) Date of Patent: Oct. 6, 2026

(54) NUMERICAL CONTROL DEVICE, CHIP REMOVAL SYSTEM, AND CHIP REMOVAL METHOD

(71) Applicant: Fanuc Corporation, Minamitsuru-gun (JP)

(72) Inventor: Takuma Ookura, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 370 days.

(21) Appl. No.: 17/790,602

(22) PCT Filed: Jan. 5, 2021

(86) PCT No.: PCT/JP2021/000065
§ 371 (c)(1),
(2) Date: Jul. 1, 2022

(87) PCT Pub. No.: WO2021/141016
PCT Pub. Date: Jul. 15, 2021

(65) Prior Publication Data

US 2023/0078825 A1 Mar. 16, 2023

(30) Foreign Application Priority Data

Jan. 7, 2020 (JP) ................................. 2020-000848

(51) Int. Cl.
*G05B 19/402* (2006.01)
*G05B 19/4065* (2006.01)

(52) U.S. Cl.
CPC ....... *G05B 19/402* (2013.01); *G05B 19/4065* (2013.01); *G05B 2219/49055* (2013.01)

(58) Field of Classification Search
None
See application file for complete search history.

(56) References Cited

U.S. PATENT DOCUMENTS 4,933,800 A * 6/1990 Yang .................. G05B 19/4062 361/29
2018/0292804 A1* 10/2018 Berman ............... G05B 19/404

FOREIGN PATENT DOCUMENTS

JP 045343 U 1/1992
JP 0691414 A 4/1994
JP 2004268176 A * 9/2004
JP 2006305704 A 11/2006
JP 6398254 B2 10/2018

OTHER PUBLICATIONS

International Search Report and Written Opinion for International Application No. PCT/JP2021/000065, dated Feb. 9, 2021, 4 pages.

* cited by examiner

*Primary Examiner* — Sean Shechtman
(74) *Attorney, Agent, or Firm* — BUCHANAN INGERSOLL & ROONEY PC

(57) ABSTRACT

A machining operation generating unit analyzes a program in accordance with a machining program stored in the storage unit and causes the machine tool to perform a normal machining operation. A chip removal operation generating unit outputs an instruction for rotating a main shaft in the reverse direction to the interpolation unit after a cutting machining performed by the machine tool ends. The chip removal operation generating unit rotates the main shaft in the reverse direction for a predetermined time.

4 Claims, 9 Drawing Sheets

NUMERICAL CONTROL DEVICE, CHIP REMOVAL SYSTEM, AND CHIP REMOVAL METHOD

CROSS REFERENCE TO RELATED APPLICATIONS

This is the U.S. National Phase application of PCT/JP2021/000065, filed Jan. 5, 2021, which claims priority to Japanese Patent Application No. JP2020/000848, filed Jan. 7, 2020, the disclosures of these applications being incorporated herein by reference in their entireties for all purposes.

FIELD OF THE INVENTION

The present invention relates to a numerical control device, a chip removal system, and a chip removal method for an industrial machine.

BACKGROUND OF THE INVENTION

In manufacturing sites, various industrial machines such as a machine tool or an industrial robot are used. Some industrial machines are for performing drilling on a workpiece by using a tool. Drilling causes chips to occur. During a drilling cycle, chips may stick to the tool. If chips stick to a tool, the machining accuracy may vary, and the chips sticking to the tool may damage a workpiece. Thus, it is required to remove chips periodically, and when manually removing chips, it is required to stop the machine and directly touch the tool, which involves complicated work.

In some conventional numerical control devices, chips are automatically removed. For example, a numerical control device disclosed in Patent Literature 1 rotates a main shaft in a direction opposite to the direction during machining and removes chips wound around a tool. During such removal, the control target of the numerical control device is the rotational rate of the main shaft. This numerical control device continues the rotation until the rotational rate of the main shaft reaches a predetermined value in the reverse rotation.

PATENT LITERATURE

PTL 1: Japanese Patent No. 6398254

SUMMARY OF THE INVENTION

When removal of chips is determined only by a rotational rate, chips may not be fully removed. Further, if the moving distance is insufficient, it will be difficult to cause the rotational rate of the main shaft to reach a predetermined value, and it is thus difficult to adjust the rotational rate.

In the field of industrial machines, there is a demand for a technology to reliably remove chips.

A control device in one aspect of the present disclosure is a control device for an industrial machine that rotates a tool to cut a workpiece, the control device includes: an operation change unit that changes a rotation direction of the tool; and a rotation time determination unit that determines a duration of reverse rotation of the tool, the operation change unit rotates the tool in a reverse direction after the tool cuts a workpiece, and the operation change unit stops the reverse rotation when the rotation time determination unit determines that the duration of the reverse rotation of the tool reached a predetermined time.

A chip removal system in one aspect of the present disclosure is a control system for an industrial machine that rotates a tool to cut a workpiece, the control system includes: an operation change unit that changes a rotation direction of the tool; and a rotation time determination unit that determines a duration of reverse rotation of the tool, the operation change unit rotates the tool in a reverse direction after the tool cuts a workpiece, and the operation change unit stops the reverse rotation when the rotation time determination unit determines that the duration of the reverse rotation of the tool reached a predetermined time.

A chip removal method in one aspect of the present disclosure is a chip removal method for an industrial machine that rotates a tool to cut a workpiece, the chip removal method includes: rotating the tool in a reverse direction after the tool cuts a workpiece; and stopping the reverse rotation of the tool when a duration of the reverse rotation of the tool reaches a predetermined time.

According to one aspect of the present invention, it is possible to reliably remove chips.

DETAILED DESCRIPTION OF EMBODIMENTS OF THE INVENTION

The present disclosure will be described below with reference to the drawings.

Figure 1:
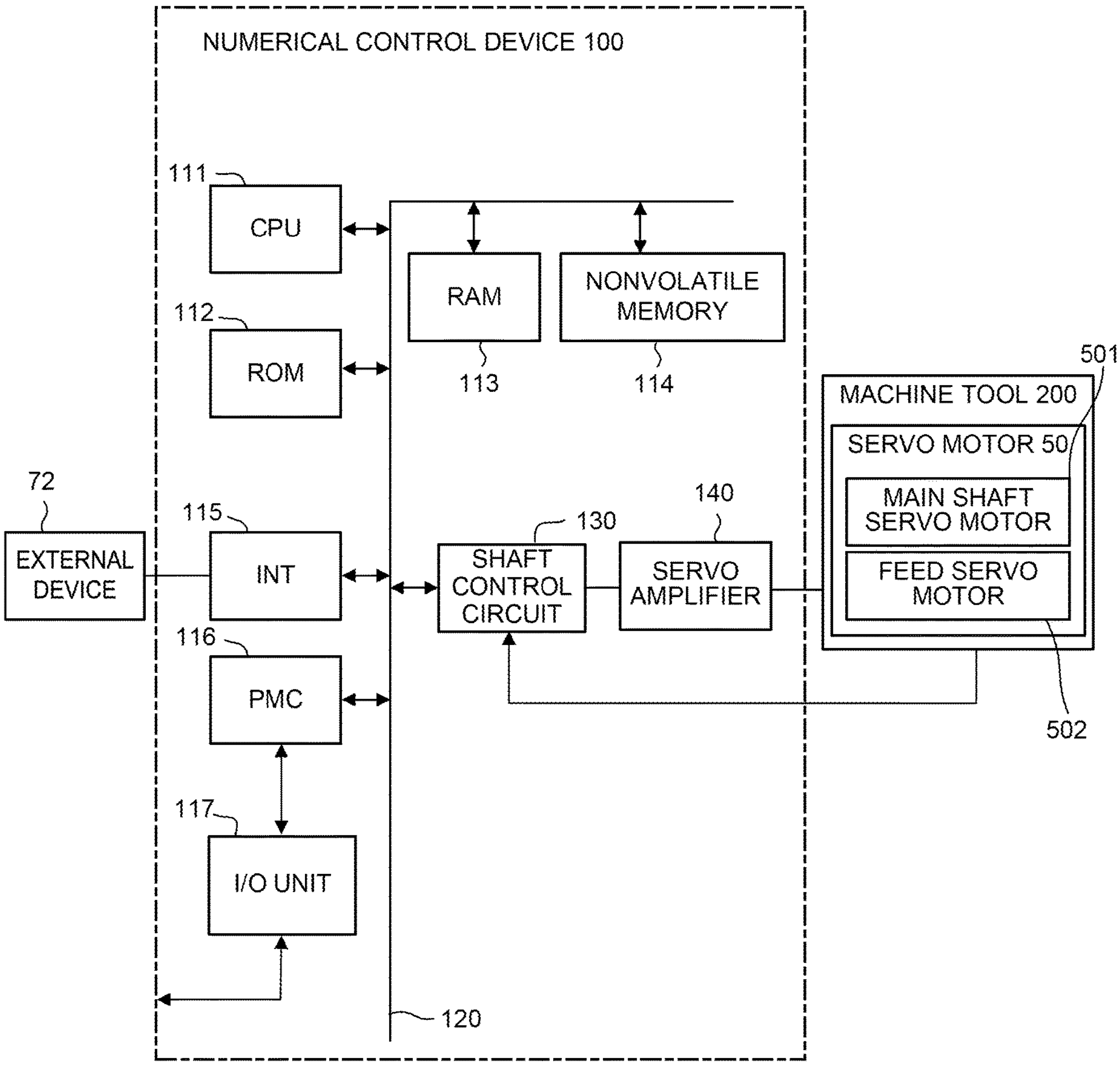
FIG. 1 is a hardware configuration diagram of a numerical control device in the present disclosure.

FIG. 1 is a schematic hardware configuration diagram illustrating a main part of a numerical control device according to one disclosure of the present disclosure.

A central processing unit (CPU) 111 of a numerical control device 100 of the present disclosure is a processor that collectively controls the numerical control device 100. The CPU 111 reads a system program stored in a read only memory (ROM) 112 via a bus 120 and controls the overall numerical control device 100 in accordance with the system program. A random access memory (RAM) 113 temporarily stores temporary calculation data or display data and externally input various data or the like.

A nonvolatile memory 114 is formed of a memory, a solid state drive (SSD), or the like backed up by a battery (not illustrated), for example, and the storage state is maintained even when the numerical control device 100 is powered off. The nonvolatile memory 114 stores a program loaded from an external device 72 via an interface 115, a program input via a display/MDI unit (not illustrated), feedback data on each motor position or speed fed back from a position/speed detector of a servo motor 50 or a position coder attached to a spindle motor, or the like. The program or various data stored in the nonvolatile memory 114 may be loaded into the RAM 113 when the program is executed or when the data is used. Further, various system programs such as a known analysis program is written in advance in the ROM 112.

The interface 115 is an interface for connecting the CPU 111 of the numerical control device 100 and the external device 72 such as a USB device to each other. A program, various parameters, or the like used for control of a machine tool are loaded from the external device 72. Further, a program, various parameters, or the like edited in the numerical control device 100 can be stored in an external storage component via the external device 72. A programmable machine controller (PMC) 116 outputs a signal to a machine tool and a peripheral device of the machine tool (for example, a tool replacement device, an actuator such as a robot, a sensor attached to the machine tool, or the like) via an I/O unit 117 and controls the machine tool and the peripheral device by using a sequence program incorporated in the numerical control device 100. Further, in response to receiving a signal from various switches of an operation panel equipped to the main unit of a machine tool, a peripheral device, or the like, the PMC 116 performs required signal processing thereon and then passes the processed signal to the CPU 111.

A shaft control circuit 130 for controlling a shaft of a machine tool outputs a shaft instruction to a servo amplifier 140 in response to receiving an instruction amount of the shaft motion from the CPU 111. In response to receiving the instruction, the servo amplifier 140 drives a servo motor 50 that moves the shaft of the machine tool. The servo motor 50 for the shaft incorporates a position/speed detector, feeds a position/speed feedback signal from this position/speed detector back to the shaft control circuit 130, and performs feedback control of the position/speed. The servo motor 50 includes a main shaft servo motor 501 and a feed servo motor 502. A tool is attached to the main shaft servo motor 501. The feed servo motor 502 moves a tool T and a workpiece W relatively in the axis direction.

Note that, although only a single shaft control circuit 130, a single servo amplifier 140, and a single servo motor 50 are illustrated in the hardware configuration diagram of FIG. 1, these components are prepared for the number corresponding to the number of shafts provided in a machine tool to be controlled in the actual implementation. Further, the shaft control circuit 130 and the servo amplifier 140 of FIG. 1 correspond to a servo motor control unit 16 described later.

Figure 2:
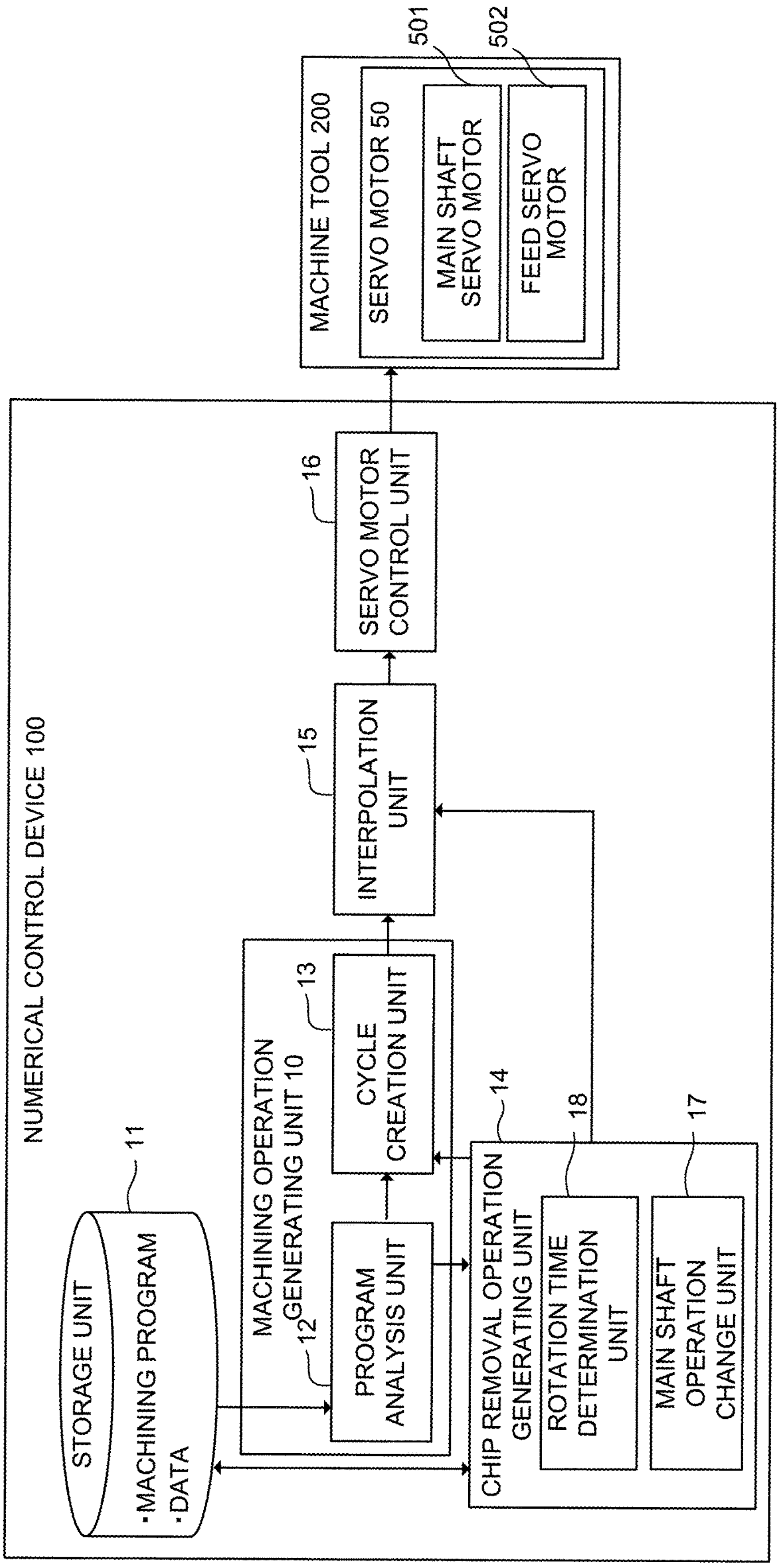
FIG. 2 is a block diagram of a numerical control device in first disclosure.

The numerical control device 100 will be described with reference to FIG. 2. The numerical control device 100 includes a storage unit 11 that stores a machining program and data, a program analysis unit 12 that analyzes the machining program, a cycle creation unit 13 that creates a drilling cycle based on the machining program, a chip removal operation generating unit 14 that generates an instruction for a chip removal operation, an interpolation unit 15 that converts various instructions into control commands for the servo motor 50, and the servo motor control unit 16 that controls the servo motor 50 of a machine tool 200. The chip removal operation generating unit 14 includes a rotation time determination unit 18 and a main shaft operation change unit 17.

The program analysis unit 12 analyzes a machining program stored in the storage unit 11. The machining program includes a fixed cycle program. In the fixed cycle program, predefined multiple blocks of instructions can be described in one block when data is input in accordance with a defined format. In the fixed cycle program, punching, tapping, drilling, boring, or the like can be instructed. In cutting machining, chips from a workpiece occur. When cutting machining is included in the machining program, the chip removal operation generating unit 14 generates a chip removal operation instruction for causing a machine tool to remove chips. In the present disclosure, drilling is performed with a fixed cycle program. The chip removal operation of the present disclosure is also applicable to another machining.

The cycle creation unit 13 converts a fixed cycle program analyzed by the program analysis unit 12 into a normal instruction and outputs the instruction to the interpolation unit 15.

When a cutting instruction is included in the machining program, the chip removal operation generating unit 14 generates an instruction for causing a machine tool to perform a chip removal operation. During the chip removal operation, the main shaft is rotated in the reverse direction for a predetermined time. The main shaft operation change unit 17 outputs an instruction for changing the rotation direction of the main shaft to the interpolation unit 15. The rotation time determination unit 18 determines that the reverse rotation duration of the main shaft has reached a predetermined time.

The interpolation unit 15 generates a control command for the servo motor 50 based on an instruction from the cycle creation unit 13 and an instruction from the chip removal operation generating unit 14.

The servo motor control unit 16 controls the servo motor 50 in accordance with a control command from the interpolation unit 15. In a case of a drilling cycle, the servo motor control unit 16 first controls the feed servo motor 502 to move the tool T to a predetermined machining position. Next, the main shaft servo motor 501 is accelerated to increase the rotational speed of the main shaft servo motor 501 to a machining speed. The tool T passes through a point R (a reference point, a cutting feed start point) in the state where the rotational speed has reached the machining speed. The tool T then enters the workpiece W and moves to a predetermined depth while cutting the workpiece W. In response to completion of the drilling of the workpiece W, the servo motor control unit 16 retracts the tool T and starts preparation for next machining. After the drilling is completed and before the next machining starts, the numerical control device 100 performs a chip removal operation. The chip removal operation is performed in parallel to a machining operation.

Figure 3:
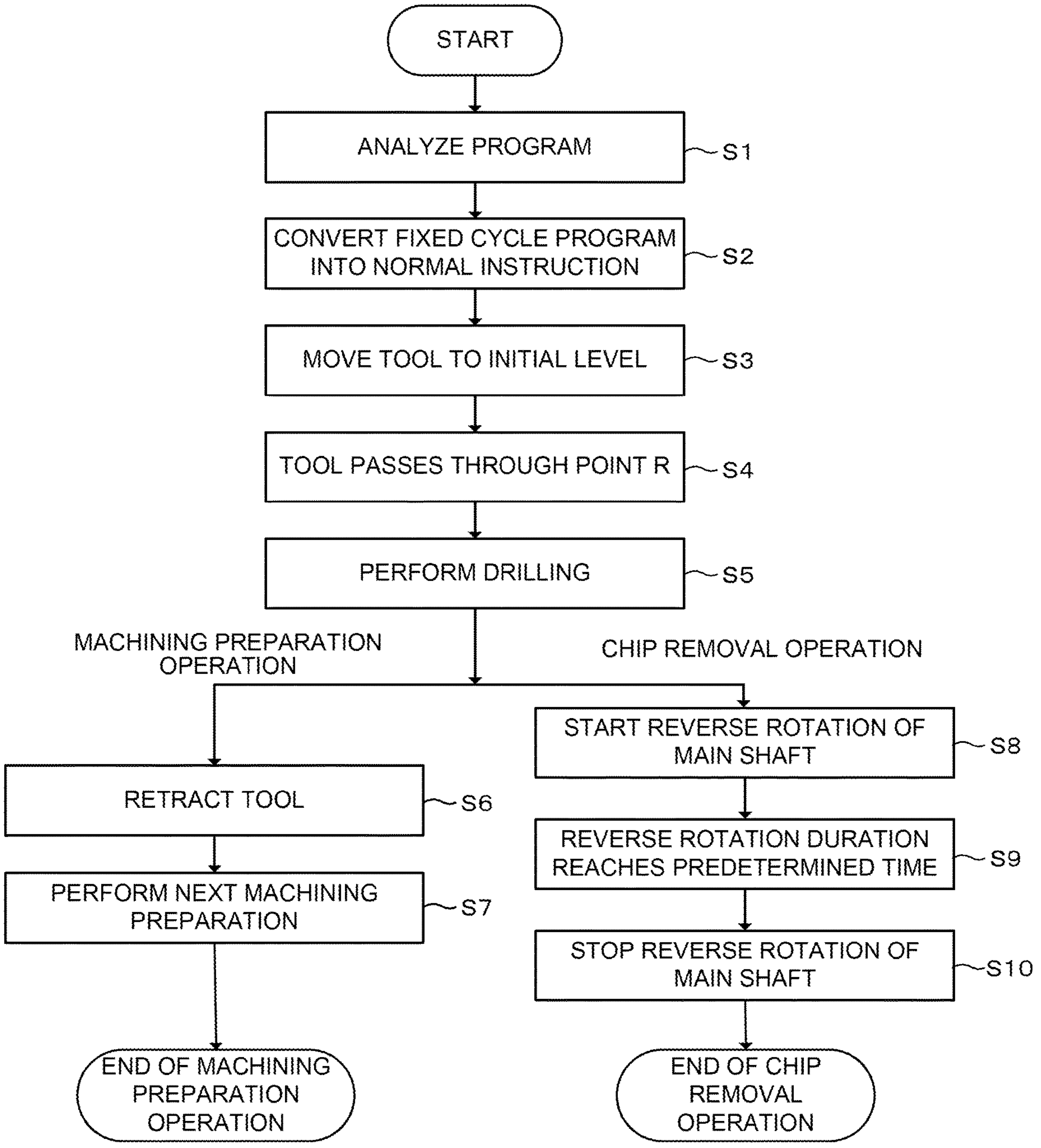
FIG. 3 is a flowchart illustrating an operation of the numerical control device in the first disclosure.

Next, the operation of the numerical control device 100 of the present disclosure will be described with reference to FIG. 3.

Once an operator provides an instruction for starting machining, the program analysis unit 12 analyzes a machining program (step S1). If a fixed cycle program is present in the machining program, the cycle creation unit 13 converts the fixed cycle program into a normal instruction (step S2) and outputs the instruction to the interpolation unit 15. The interpolation unit 15 generates a control command for the servo motor 50 in accordance with the instruction from the cycle creation unit 13. The servo motor control unit 16 controls the servo motor 50 in accordance with the control command from the interpolation unit 15. In the present disclosure, the numerical control device 100 performs drilling machining in accordance with the fixed cycle program.

In the drilling machining, the feed servo motor 502 moves the tool T to a machining position. At this time, the position on the Z-axis of the tool T is referred to as an initial level (step S3). The initial level is a position from which fixed cycle machining starts. Next, the feed servo motor 502 increases the rotational speed of the main shaft servo motor 501 close to the machining speed while moving the tool T to come close to the workpiece W. The rotational speed of the main shaft servo motor 501 reaches the machining speed before the tool T passes through the point R.

After the tool T passes through the point R (step S4) and reaches the surface of the workpiece W, the drilling starts. The tool T is moved to the hole bottom and performs drilling while rotating the main shaft (step S5). When the drilling ends, the tool T is retracted (step S6). The next machining is then prepared (step S7).

The chip removal operation generating unit 14 performs a chip removal operation after the tool T has left the workpiece W and before the next machining starts. Note that whether or not the tool T and the workpiece W are separated from each other is determined based on a load applied to the tool T or on the point R.

In the chip removal operation, the main shaft operation change unit 17 first outputs an instruction to the interpolation unit 15 to start reverse rotation of the main shaft servo motor 501 (step S8). The rotation time determination unit 18 determines whether or not the duration of the reverse rotation of the main shaft has reached a predetermined time. In response to the duration of the reverse rotation reaching a predetermined time (step S9), the main shaft operation change unit 17 outputs an instruction to the interpolation unit 15 to stop the reverse rotation of the main shaft servo motor 501 (step S10).

As described above, the numerical control device 100 of the first disclosure can remove chips sticked to the tool T by rotating the tool T in the reverse direction for a predetermined time. Note that the rotational speed when the tool T is being rotated in the reverse direction is found from a relationship with a rotation time.

Next, second disclosure will be illustrated. The numerical control device 100 of FIG. 4 includes a main shaft position determination unit 19 that determines whether or not the main shaft has reached the initial level and a standby process unit 20 that performs standby for the operation of the main shaft. This numerical control device 100 determines whether or not the main shaft has reached the initial level and, if the main shaft is at the initial level, performs a chip removal operation.

Figure 4:
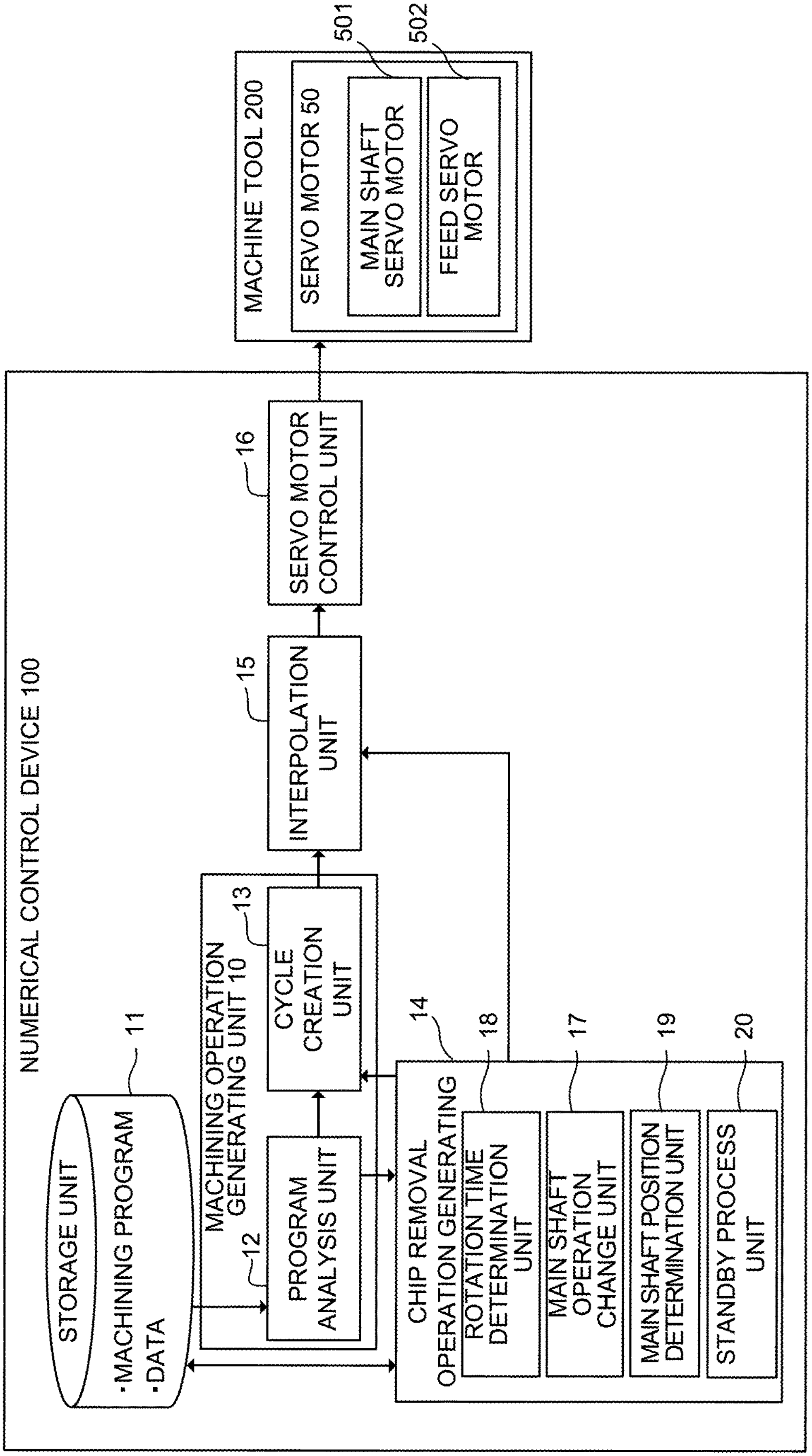
FIG. 4 is a block diagram of a numerical control device in second disclosure.
Figure 5:
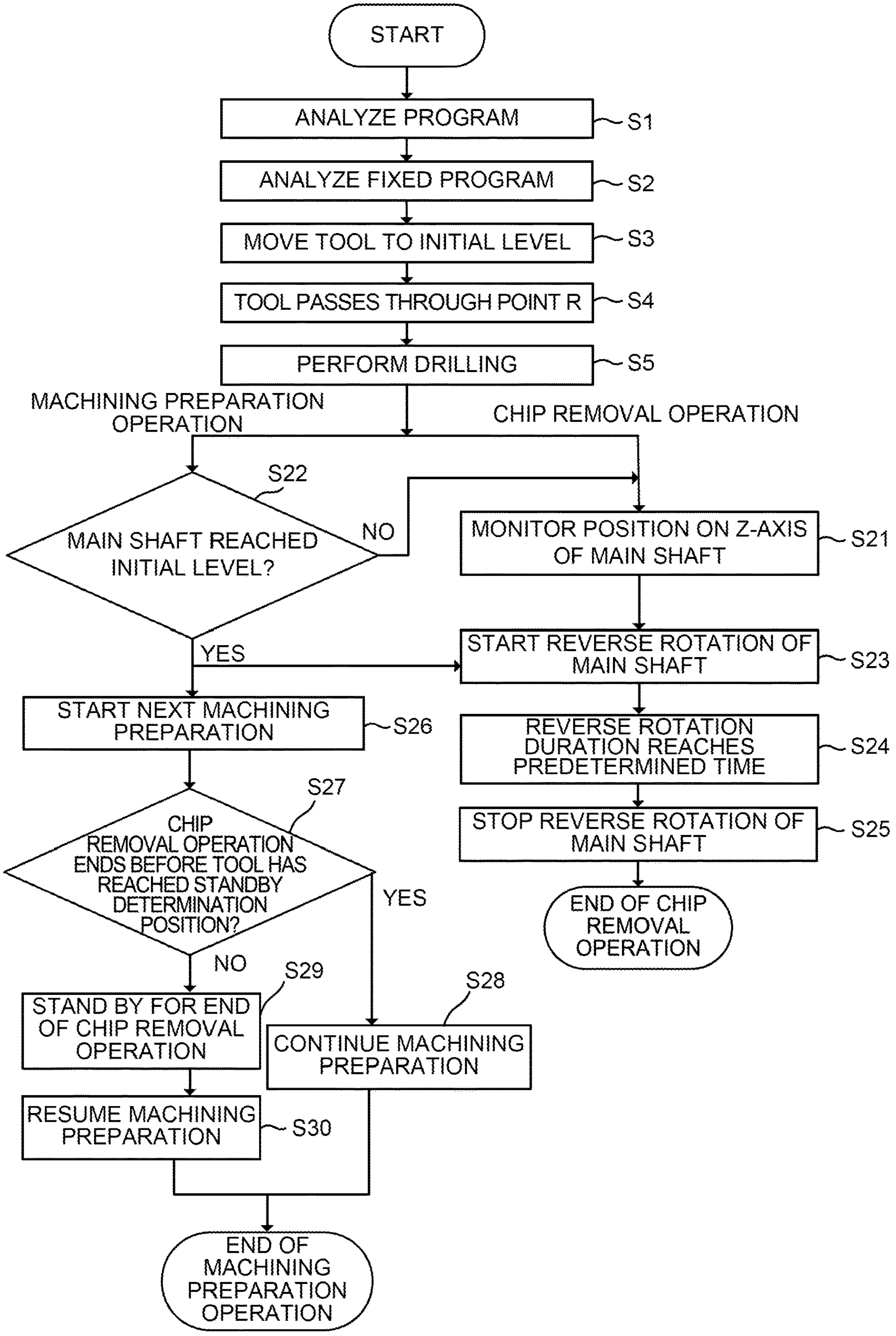
FIG. 5 is a flowchart illustrating an operation of the numerical control device in the second disclosure.

FIG. 5 is a flowchart illustrating the operation of the numerical control device 100 of the second disclosure. Since the process from step S1 to step S5 of this flowchart is the same as that in the operation of FIG. 4, the description thereof will be omitted. In response to the end of the drilling in step S5, the main shaft position determination unit 19 monitors the position on the Z-axis of the main shaft (step S21). The main shaft position determination unit 19 monitors the position of the main shaft until the main shaft reaches the initial level (step S22; NO). If the main shaft reaches the initial level (step S22; YES), the main shaft operation change unit 17 outputs an instruction for starting reverse rotation of the main shaft to the interpolation unit 15. The servo motor control unit 16 rotates the main shaft servo motor 501 in the reverse direction (step S23). The rotation time determination unit 18 determines whether or not the duration of the reverse rotation has reached a predetermined time. When the duration of the reverse rotation has reached the predetermined time (step S24), the main shaft operation change unit 17 outputs an instruction for stopping the reverse rotation of the main shaft to the interpolation unit 15. The servo motor control unit 16 stops the reverse rotation of the main shaft in accordance with the control command from the interpolation unit 15 (step S25). The chip removal operation ends here.

If the main shaft reaches the initial level (step S22; YES), the numerical control device 100 starts preparation for next machining in parallel to the chip removal operation of step S23 to step S25 (step S26).

The standby process unit 20 determines whether or not the chip removal operation has ended when the tool T passes through a predetermined position (referred to as a standby determination position). If the chip removal operation has ended when the tool T has reached the standby determination position (step S27; YES), the numerical control device 100 continues the machining preparation in accordance with the machining program (step S28). If the chip removal operation has not yet ended when the tool T has reached the standby determination position (step S27; NO), the standby process unit 20 outputs an instruction to the interpolation unit 15 to stop rapid traverse of the tool T that is a machining preparation operation, and the tool T stands by for the chip removal operation to end (step S29). In response to the end of the chip removal operation, the machining preparation is resumed (step S30).

Figure 6:
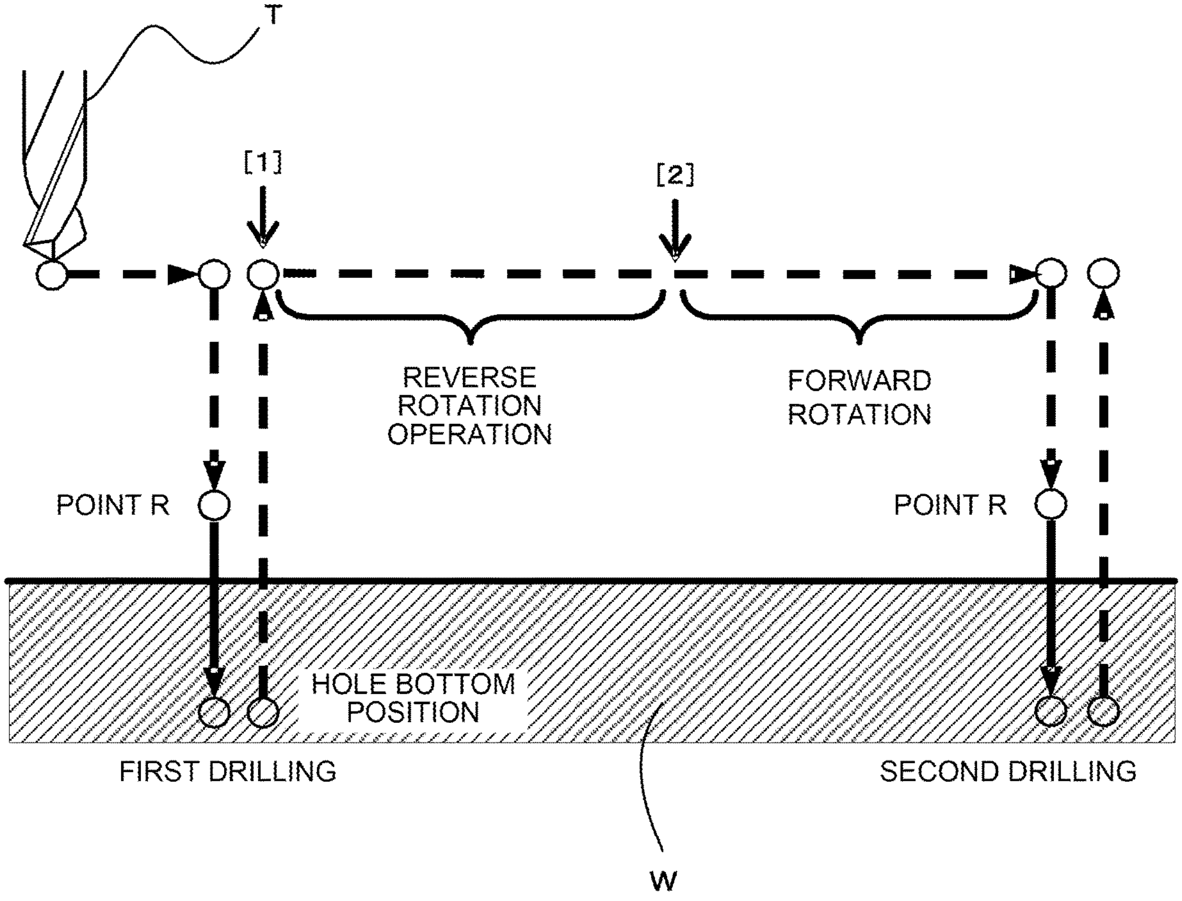
FIG. 6 is a diagram illustrating movement of a tool in a chip removal operation.
Figure 7:
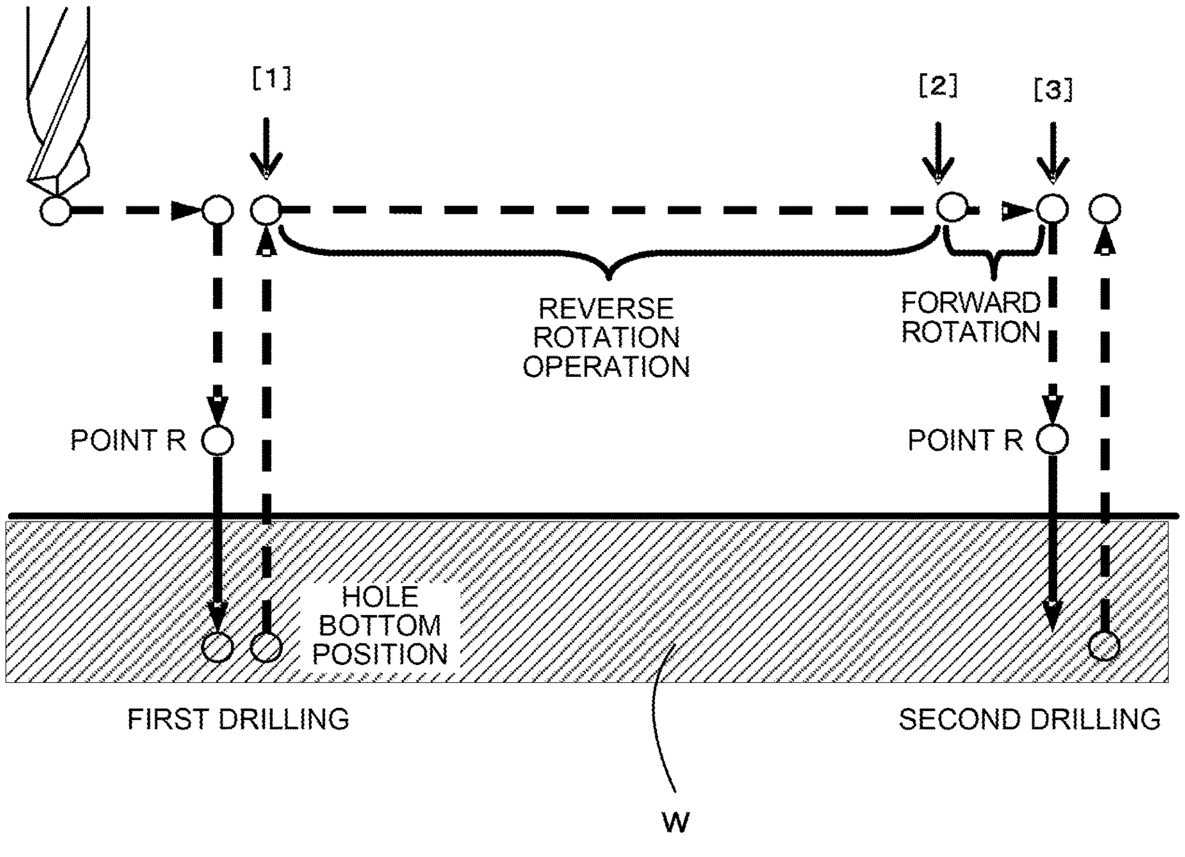
FIG. 7 is a diagram illustrating movement of a tool in a chip removal operation.

FIG. 6 and FIG. 7 illustrate the movement of the tool T when continuously performing drilling. In the example of FIG. 6, the tool T does not stand by. In the example of FIG. 7, the tool T stands by.

First, FIG. 6 will be described. After drilling performed by the tool T ends, the tool is once returned to the initial level ([1] in FIG. 6). At this time, as a preparation operation for the next machining, the tool T is rapidly traversed and moved to the next machining position. This is a normal machining preparation operation described in the machining program. The numerical control device 100 starts a chip removal operation at the same time as the normal machining preparation operation.

Specifically, the main shaft operation change unit 17 outputs an instruction to the interpolation unit 15 to rotate the tool T in the reverse direction. The rotation time determination unit 18 determines whether or not the duration of the reverse rotation has reached a predetermined time. When the duration of the reverse rotation has reached the predetermined time, the main shaft operation change unit 17 stops the reverse rotation. The reference [2] in FIG. 6 represents the end position of the reverse rotation. At the position [2] in FIG. 6, the tool T is moving toward a next machining position. Thus, the numerical control device 100 continues the normal machining preparation in accordance with the machining program. That is, the main shaft is rotated in the forward direction and rapidly traversed to the next machining position. In response to reaching the next machining position, the numerical control device 100 starts second drilling.

FIG. 7 illustrates a chip removal operation when the tool T stands by for machining preparation. When the tool T has reached the initial level ([1] in FIG. 7) after the end of drilling, the reverse rotation of the tool T starts at the same time the rapid traverse of the tool T starts. While the tool T translates at the initial level, the standby process unit 20 outputs an instruction for stopping the rapid traverse to the interpolation unit 15 if the duration of the reverse rotation has not yet reached a predetermined time when the tool T has reached a certain position ([2] in FIG. 7; referred to as a standby determination position) on the motion path. The tool T stops the rapid traverse and stands by until the chip removal operation ends. When the chip removal operation ends, the rapid traverse is resumed and moves the tool T to the next machining position. In response to the tool T reaching the next machining position ([3] in FIG. 7), the numerical control device 100 performs second drilling.

In the examples of FIG. 6 and FIG. 7, the tool T is rotated in the reverse direction in parallel to rapid traverse of the tool T, and thereby chips are removed. It is possible to start chip removal operation when the tool T reaches the initial level (or the point R) also in another operation such as a case of performing double machining without changing the machining position or a case of supplying air while slightly shifting the tool, for example, in addition to rapid traverse of the tool.

Figure 8:
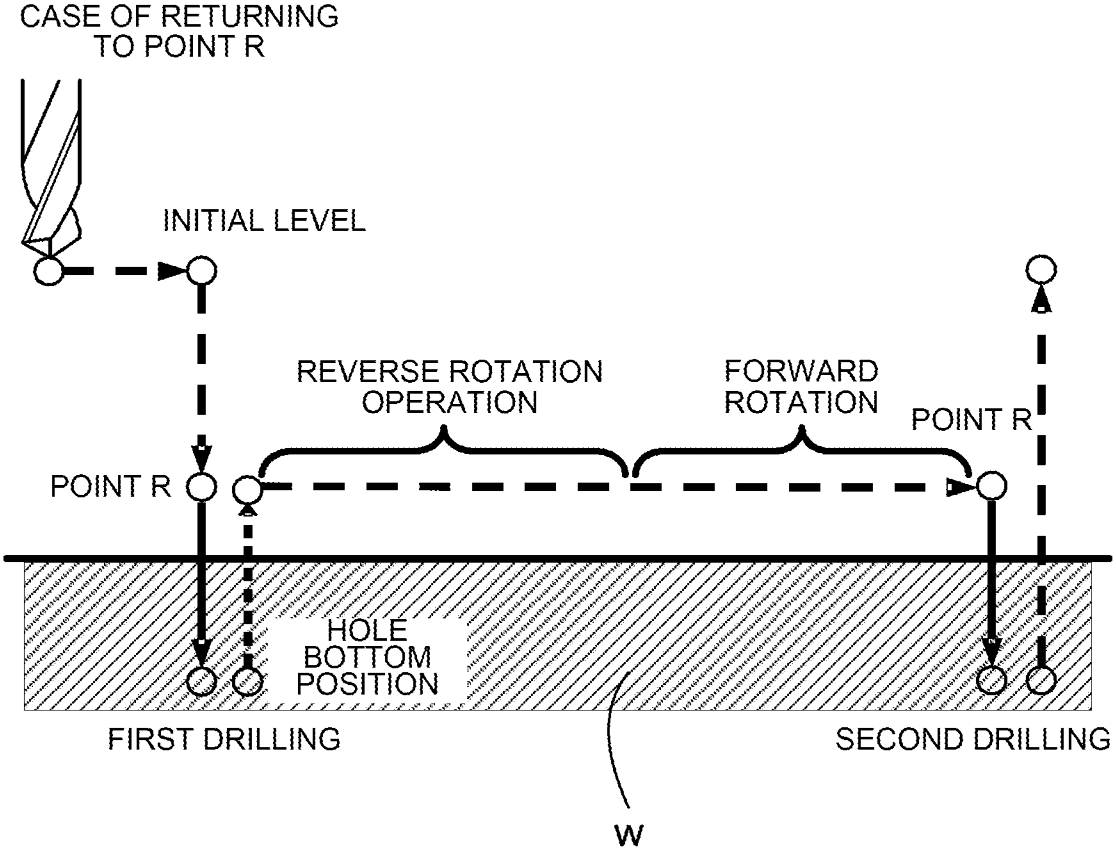
FIG. 8 is a diagram illustrating movement of a tool in a chip removal operation.

Once a chip removal operation starts at the initial level, it is desirable not to lower the tool T until the chip removal operation ends. Further, as illustrated in FIG. 8, a preparation operation for next machining may be started at the point R level instead of the initial level. In such a case, it is possible to start a chip removal operation at the point of time that the tool T reaches the point R level. Once a chip removal operation starts at the point R level, it is desirable not to lower the tool T until the chip removal operation ends.

The numerical control device 100 of FIG. 4 performs a chip removal operation at the initial level (or the point R level). In such a chip removal operation, since the reverse rotation of the tool is controlled with time, this enables efficient removal of chips. Further, since the control is performed with time, this contributes to easy adjustment of cycle time. Since a chip removal operation is performed after the initial level is reached, this contributes to a quick retraction operation when a problem occurs in the machine tool 200. Furthermore, when a chip removal operation is performed at the initial level, since the tool is distant from a workpiece, chips are less likely to come into contact with the workpiece.

Note that, although the tool T is controlled to stand by at the standby determination position at which it is determined whether or not to cause the tool T to stand by in the description of FIG. 7, the tool T may be moved and then caused to stand by at a different standby position from the standby determination position if necessary.

Next, third disclosure will be described. The numerical control device 100 of FIG. 9 includes a time table 21 that associates the material of the tool T or the workpiece W with the reverse rotation time of the tool T and a time selection unit 22 that selects a reverse rotation time with reference to the time table 21. The time table 21 lists the reverse rotation time of the tool T suitable to the material of the tool T or the workpiece W. The time selection unit 22 selects a reverse rotation time of the tool T in accordance with the material of the tool T or the workpiece W with reference to the time table 21. The information on the material of the tool T or the workpiece W may be input by the operator or may be read from the storage unit 11. The rotation time determination unit 18 rotates the tool T in the reverse direction for the time selected by the time selection unit 22.

Figure 9:
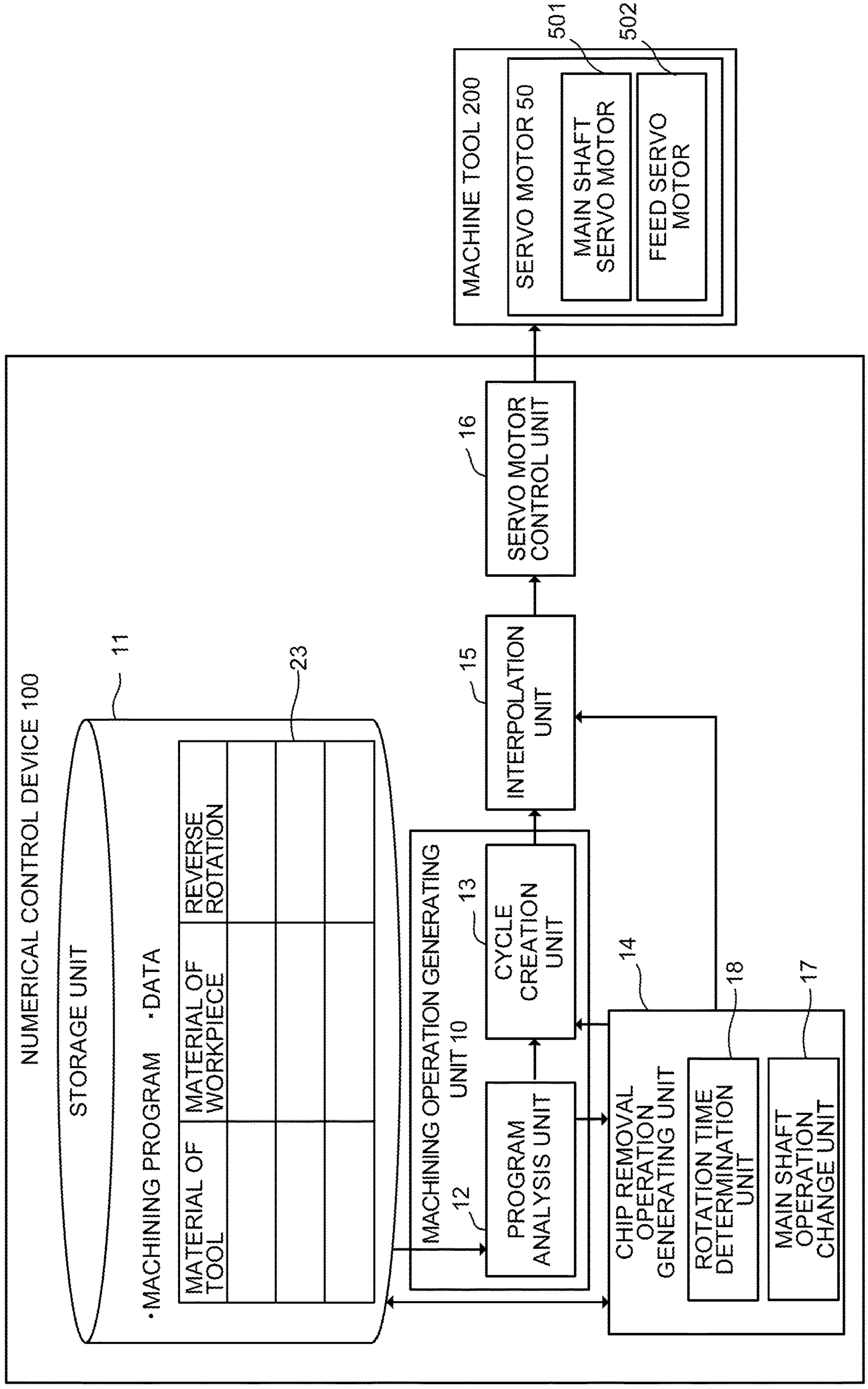
FIG. 9 is a block diagram of a numerical control device in third disclosure.

The numerical control device 100 of FIG. 9 changes the reverse rotation time in accordance with the material of a tool or a workpiece. For example, when a material having high viscosity is machined, a chip will be longer. In such a case, since a long chip easily sticks, the reverse rotation time is set longer. In contrast, in a case of a fragile material having low viscosity, since a chip is shorter, the reverse rotation time may be shorter.

The numerical control device 100 of FIG. 9 changes the reverse rotation time of the tool T in accordance with the material of the tool T or the workpiece W and therefore can more efficiently remove chips.

LIST OF REFERENCE NUMERALS

100 numerical control device
111 CPU
11 storage unit
12 program analysis unit
14 chip removal operation generating unit
15 interpolation unit
16 servo motor control unit
17 main shaft operation change unit
18 rotation time determination unit
19 main shaft position determination unit
20 standby process unit
21 time table
22 time selection unit

The invention claimed is:

1. A control device for an industrial machine that rotates a tool to cut a workpiece, the control device comprising:
one or more processors that execute computer executable instructions stored in a memory,
wherein the execution of the computer executable instructions configures the one or more processors of the control device to:
select a time of a reverse rotation of the tool in accordance with material of the tool and a material of the workpiece;
monitor a position of the tool;
generate a reverse rotation instruction to start reverse rotation at a predetermined position of the monitored position for the tool;
change a rotation direction of the tool in accordance with the reverse rotation instruction at an end of the tool cutting the workpiece;
rotate the tool in the reverse direction after the tool cuts the workpiece; and
stop the reverse rotation of the tool at the selected time for the rotation of the tool
control the industrial machine in accordance with a machining program and cause the industrial machine to perform an operation in accordance with the machining program; and
perform standby for the operation in accordance with the machining program while the reverse rotation continues.

2. The control device according to claim 1, wherein the predetermined position is an initial level of the tool.

3. The control device according to claim 1, wherein the one or more processors of the control device are further configured to control the industrial machine in accordance with a machining program and cause the industrial machine to perform an operation in accordance with the machining program,
wherein the reverse rotation of the tool and the operation in accordance with the machining program are performed in parallel.

4. A chip removal method for an industrial machine that rotates a tool to cut a workpiece, the chip removal method comprising:
monitoring a position of the tool;
generating a reverse rotation instruction to start reverse rotation at a predetermined position of the monitored position of the tool, wherein the reverse rotation instruction includes changing a rotation direction of the tool at an end of the tool cutting the workpiece;
rotating the tool in a reverse direction in accordance with the reverse rotation instruction; and stopping the reverse rotation of the tool at a predetermined time selected in accordance with a material of the tool and a material of the workpiece controlling the industrial machine in accordance with a machining program and cause the industrial machine to perform an operation in accordance with the machining program; and performing standby for the operation in accordance with the machining program while the reverse rotation continues.

* * * * *